United States Patent [19]

Darrieux

[11] Patent Number: 5,000,397
[45] Date of Patent: Mar. 19, 1991

[54] CASSETTE FOR THE STORAGE AND DISPENSING OF THREAD OR RIBBON AT A PRESET TENSION

[75] Inventor: Jean-Louis Darrieux, Merignac, France

[73] Assignee: Aerospatiale Societe Nationale Industrielle, Paris, France

[21] Appl. No.: 342,195

[22] Filed: Apr. 24, 1989

[30] Foreign Application Priority Data

Apr. 25, 1988 [FR] France .................................. 88 05438

[51] Int. Cl.$^5$ ...................... B65H 59/02; B65H 49/18
[52] U.S. Cl. .................................. 242/156; 242/75.4;
242/155 R; 242/129.3; 242/129.8
[58] Field of Search ........................ 242/156, 156.2, 45,
242/129.3, 75.4, 54 R, 55.2, 55.53, 129.5, 129.8,
134, 137, 137.1, 138, 141, 146

[56] References Cited

U.S. PATENT DOCUMENTS

| | | | |
|---|---|---|---|
| 218,974 | 8/1879 | Howard et al. | 242/129.3 X |
| 460,723 | 10/1891 | Eisenhart | 242/129.3 |
| 1,541,562 | 6/1925 | Gilbert et al. | 242/146 |
| 2,406,846 | 9/1946 | Muller | 242/129.3 X |
| 3,084,887 | 4/1963 | Bernd | 242/155 R |
| 3,531,057 | 9/1970 | Way | 242/55.2 |
| 3,572,605 | 3/1971 | De Forest | 242/137.1 |
| 3,682,413 | 8/1972 | Klimek | 242/156.2 |
| 4,462,551 | 7/1984 | Bloch | 242/129.3 |

FOREIGN PATENT DOCUMENTS

| | | | |
|---|---|---|---|
| 204563 | 11/1956 | Australia | 242/156 |
| 2139420 | 2/1973 | Fed. Rep. of Germany . | |
| 1008696 | 5/1952 | France . | |
| 2606003 | 10/1986 | France . | |
| 9688 | 4/1970 | Japan | 242/129.3 |
| 1318746 | 8/1970 | United Kingdom . | |

Primary Examiner—Stanley N. Gilreath
Attorney, Agent, or Firm—Armstrong, Nikaido, Marmelstein, Kubovcik & Murray

[57] ABSTRACT

A cassette for storing and dispensing filamentary material to a machine for producing hollow articles by filament winding includes a housing having an outlet; a spindle supported internally of the housing; a hollow roll rotatably mounted on the spindle; and a reel of filamentary material carried by the hollow roll. The reel is fixed for rotation with the hollow roll and the hollow roll is rotatable in one direction to permit unwinding of the filamentary material from the reel. A force opposing the unwinding of the filamentary material is provided by a device located internally of the hollow roll. An adjustable braking mechanism is provided to establish a first tension on the filamentary material and an additional tensioning force is applied to the filamentary material by a complementary tensioning arrangement.

6 Claims, 2 Drawing Sheets

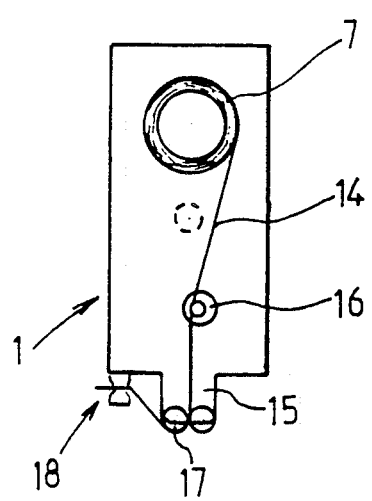
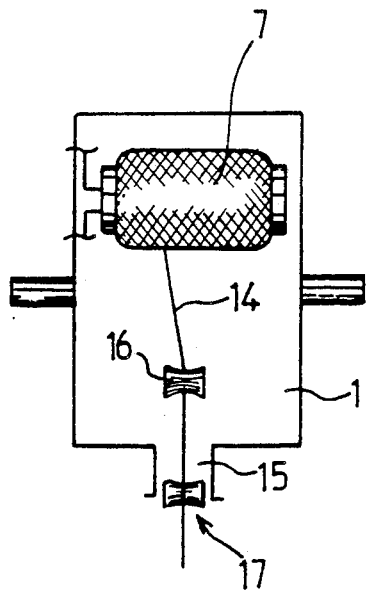
FIG. 2   FIG. 3
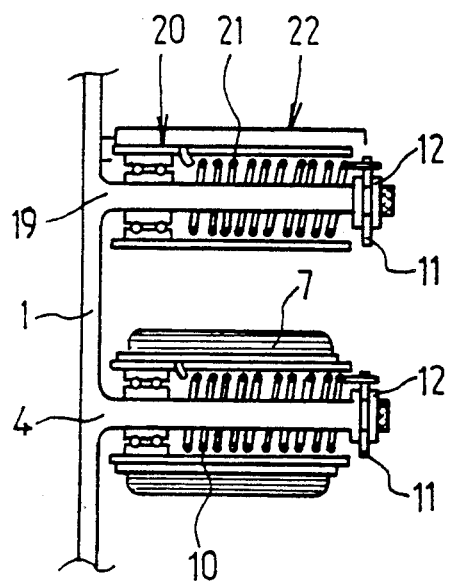
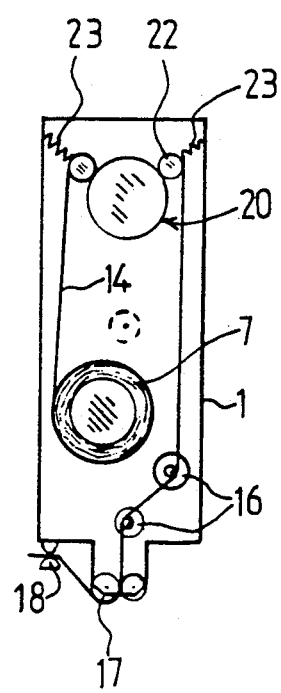
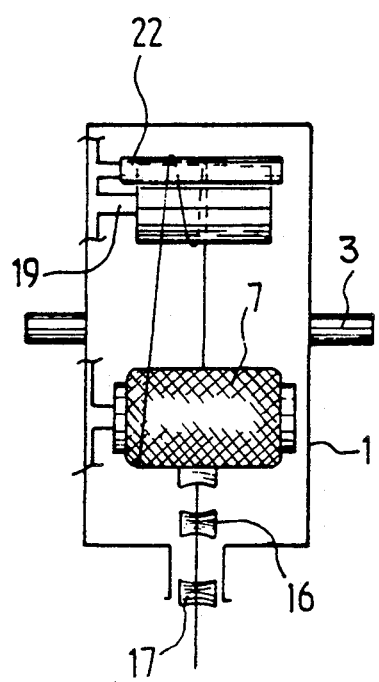
FIG. 4   FIG. 5   FIG. 6

CASSETTE FOR THE STORAGE AND DISPENSING OF THREAD OR RIBBON AT A PRESET TENSION

The invention, which relates to a support for reels of thread intended for use in a machine for producing hollow articles by filament winding, concerns more particularly a cassette for the storage and dispensing of thread or ribbon at a preset tension.

BACKGROUND OF THE INVENTION

In the field of filament winding of threads or ribbons of fibres on a mandrel, it is common to place the latter on a machine that imparts thereto a generally rotational movement by which the mandrel draws off the thread and winds it onto itself. According to other known techniques, for example for the purpose of producing and winding around tubes, a frame is provided to revolve around an article that winds the thread about the said article, which can itself have imparted to it a movement relative to the frame. In all cases, the thread or the fibre intended to form the filamentary winding is dispensed from a reel which is usually formed by a cylindrical cardboard support onto which the thread is wound, which reel is capable of maintaining the thread in wound condition and allows it to wind off under the traction effect caused by the movement of the mandrel. In certain special cases, more precisely when the thread has to be wound onto an irregularly shaped support, it must be possible for the thread to be wound off from the reel at a constant tension so that winding around the article also takes place in a manner that is constant, whatever the configuration of the article to be wound. This tension must further be adjustable by the user in accordance with the winding sought after, and classical dispensing reels do not afford this possibility. Certain windings also necessitate large quantities of thread, and when a reel is empty, it is then necessary to substitute a fresh reel therefor, and consequently, interrupt winding in order to bond together the strands from the two reels. If a previous dispensing tension has been set for the first reel, the setting has to be repeated so that this pretensioning is also applied to the second reel, which is not always easy to achieve with the classical dispensing reels.

There are known, of course, systems of housings containing threads or ribbons that unwind when pulled upon and that rewind when released, such as, for example, an electric cable drum, a tape measure or a dog leash. But none of these systems possesses the new mechanical functions necessitated by the modern techniques of filament winding, which require means for replenishment with thread and for unwinding thread continuously at a constant adjustable tension, as indicated above.

SUMMARY OF THE INVENTION

The invention aims to remedy the drawbacks of the known thread dispensers in that it provides a cassette for the storage and dispensing of threads, especially designed to permit filament windings with the help of any support having a movement relative to the article to be wound, the said cassette being particularly suitable for use in a universal winding machine permitting the processing of articles of variable shapes and sizes.

For this purpose, the object of the invention is a cassette for storing thread or ribbon containing at least one reel comprising means enabling the thread to unwind against a force tending to rewind the said thread around the reel, a cassette in which the reel of thread is mounted on a rotating roll provided with at least one member opposing the unwinding of the said reel which is associated with a braking mechanism, the said braking mechanism being adjustable to provide for pre-tensioning of the thread delivered by the cassette, the latter being further provided with a complementary means making it possible, if necessary, to increase at the output from the cassette the pre-tensioning of the thread obtained with the reel.

More precisely, the member opposing the unwinding of the reel is a spring concentric with the spindle bearing its support roll, one end of which is fixed to the said roll and the other end of which is connected to the braking mechanism, which is constituted by a small disk rotating freely on the fixed end of the gripping spindle of the cassette, and by a braking shoe capable of being applied to the disk and of withdrawing therefrom under the action of a screw engaging with the said spindle.

According to another feature of the invention, a complementary means making it possible to increase the pre-tensioning of the thread is formed by at least one supplementary roll with a rubberized surface which contains a spring one end of which is connected to the roll and the other end of which is connected to a braking mechanism analogous with that of the reel roll, two small complementary thread holding rolls being applied against the main roll. Further particular features and advantages of the invention will become apparent from reading the description that follows of the forms of embodiment taken by way of non-limitative examples and with reference to the drawings.

BRIEF DESCRIPTION OF THE DRAWINGS

FIGS. 2 and 3 are schematic side and front views of the one-reel cassette;

FIG. 4 is a cross-sectional view of an alternative form of embodiment; and

FIGS. 5 and 6 are side and front views of a cassette according to the alternative form of embodiment of FIG. 4.

Figure 1:
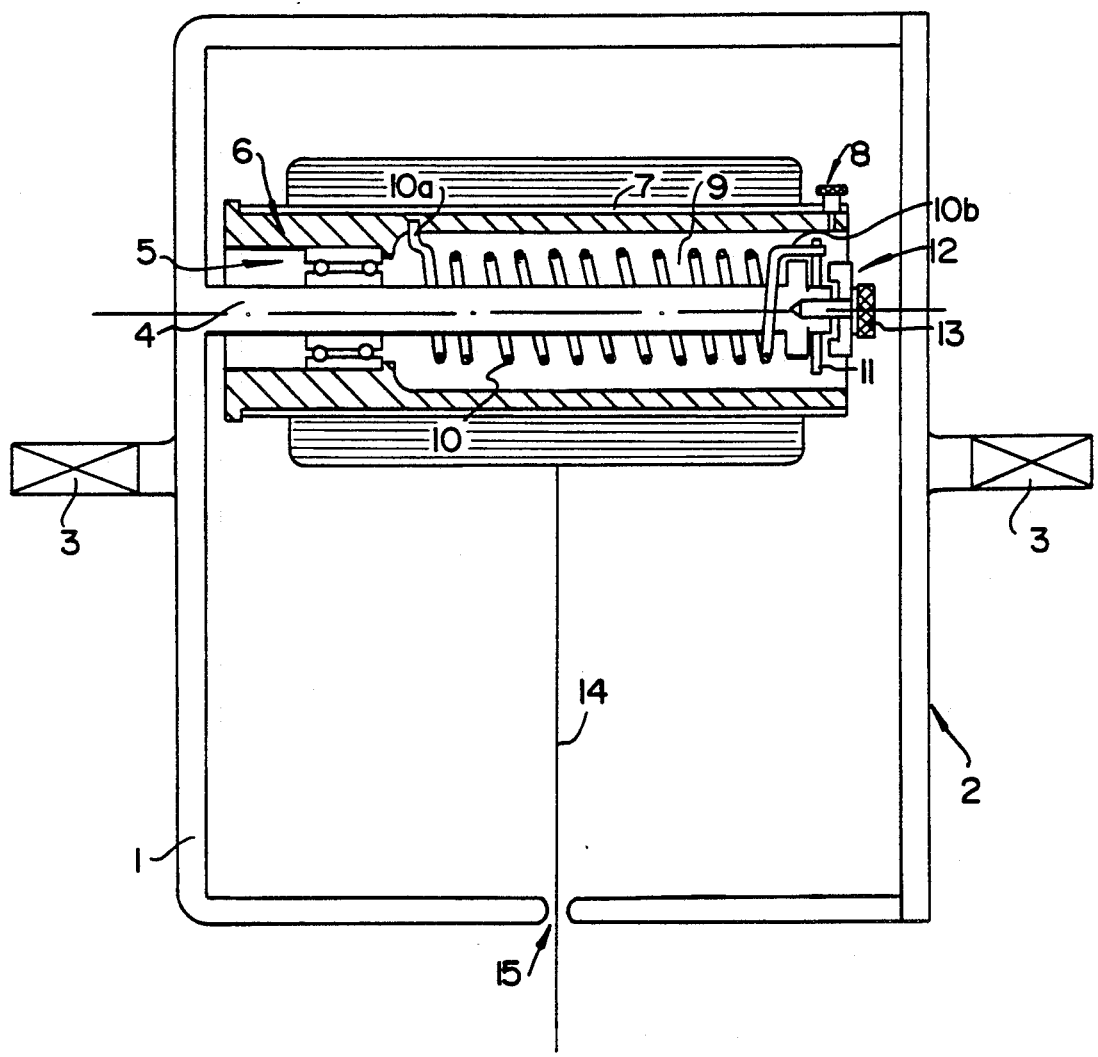
FIG. 1 is a cross-sectional view of a cassette.

The cassette schematically represented in FIG. 1 takes the form of a housing 1 one face or portion 2 of which is removable to permit access to the interior. It is provided on two opposite faces with gripping spindles 3 by means of which it can be rendered integral with a support by one or the other of the two spindles, or by both. Cassette 1 has an internal spindle 4 on which is mounted an antifriction bearing 5 carrying a rotating roll serving as a support for a thread reel 7. The reel is immobilized on the roll by means of lock screw 8. The roll 6 is hollow and, in the space 9 provided between its inner face and spindle 4 is placed a spring 10 concentric with the spindle and one end 10a of which is fixed to the roll and the other end of which, 10b, is connected to a small disk 11 rotating freely on the fixed end of shaft 4. Opposite disk 11 is mounted a braking shoe 12 capable of being applied against the disk or of withdrawing therefrom under the action of a screw 13 engaging with spindle 4. The thread 14 delivered by the reel 7 leaves cassette 1 by an orifice 15. We can see from FIGS. 2 and 3 that the thread 14 is guided by an intermediate pulley 16 inside the cassette, then by output rollers 17 at the orifice 15, a thread halting mechanism 18 being provided on cassette 1 to immobilize the thread wound off.

When the reel 7 is fixed to its roll 6 and immobilized by screw 8, a portion of the thread 14 is run out through orifice 15. Then, by acting on screw 13, shoe 12 is tightened against braking disk 11, which has the effect of preventing the latter from rotating. If it is wished for the pre-tensioning of the thread to be 3 kg, a 3 kg weight is suspended from the thread. The thread will then unwind from the reel and the weight will descend. During this phase, since the end 10b of the spring 10 is immobilized by disk 11 which is blocked, the other end 10a, rotating with reel 7, will wind up the spring until the weight is immobilized. The braking shoe 12 is then progressively released until disk 11 begins to slide over it and the weight begins to descend. The cassette is adjusted and when the weight is immobilized, the braking shoe 12 maintains in wound condition the spring 10 that applies a tension of 3 kg to the thread. If the weight is caused to reverse direction, the thread will rewind around the reel with degressive tension until the spring has returned to its initial rest position. It is the length and the stiffness of the spring that determines the possible thread length that the cassette can rewind or reincorporate. This pre-tensioning of the spring having been regulated, it is possible, for example, to run the thread over pulley 16, then between the output rollers 17, and to pull on it, once more winding up the spring, until the braking shoe 12 again begins to slide. The thread is then pre-tensioned at 3 kg and it is immobilized with the thread halting mechanism 18. The removable portion 2 of the cassette is then re-closed. The cassette is then ready for use.

This arrangement can, however, be used only for relatively small thread pre-tensioning values, for example up to approximately 3 kg. Beyond that, the tension exerts too great a pressure on the threads of the preceding layers on the reel and is liable to damage them.

That is why there is provided a cassette that increases the pre-tensioning of the thread obtained with the reel adapted to higher tensions which can go, for example, up to 12 kg. This cassette 1, as illustrated in FIGS. 4 to 6, also has on an internal spindle 4 a reel of thread 7 provided with the same internal spring 10 and the same braking mechanisms 11, 12. On the other hand, on another internal spindle 19 is mounted a supplementary roll 20 the surface of which is covered with a film of rubber. This roll 20 also contains a spring, 21, one end of which is connected to the roll and the other end of which is connected to an analogous braking mechanism (11, 12).

On either side of roll 20 are mounted two small thread holding rolls 22, free to rotate, biassed against roll 20 by small springs 23. Springs 10 and 21 are chosen in such a way that the capacity of rubberized roll 20 to rewind or reincorporate the thread is less than or equal to that of the reel 7 in order to prevent the thread from slackening between reel 7 and roll 20 when the thread of the cassette is reincorporated. This being said, the two springs, 10 and 21, are adjusted independently and in the same way as when setting the reel, as described above with reference to FIG. 1, using weights. It is thus possible, for example, to adjust the brake of reel 7 to 2 kg and the brake of the roll 20 to 10 kg. The pre-tensioning of the thread at the output from the cassette will thus be 12 kg.

The cassettes described above comprised a single thread reel. It is possible to contemplate, without departing from the scope of the invention, loading the cassette with several reels of thread which would, for example, be connected in series, and each of which would be equipped with the braking mechanism described earlier, in such a way that, after the exhaustion of one reel, the following reel can be used without a pause.

To make ready for operation, after reel 7 has been mounted and locked on its spindle 4, thread 14 is passed, as we can see in particular from FIGS. 5 and 6, around a first thread holding roll 22, then around rubberized roll 20 and around the second thread holding roll 22. Then the thread is drawn over intermediate pulleys 16 as far as the output rolls 17, then outside until the braking shoes 12 of the reel and of the roll begin sliding. The thread is then pre-tensioned and it can be immobilized using the thread halting mechanism 18.

The cassettes thus described are, therefore, capable of rewinding or reincorporating thread. This makes it possible, if a cassette during a winding operation is no longer in movement, to keep the thread tensioned, but also to remove the cassette from its path and return it thereto without any loss of tensioning and thread path, for example when it is wished to effect connections between threads from one cassette to another.

In any case, these cassettes can be used in any other application requiring pre-tensioning of the thread or of the ribbon stored.

I claim:

1. A cassette for storing and dispensing filamentary material to a machine for producing hollow articles by filament winding comprising:

a housing having an outlet;

a spindle supported internally of said housing;

a hollow roll rotatably mounted on said spindle;

a reel of filamentary material carried by said hollow roll, said reel being fixed for rotation with said hollow roll and said hollow roll being rotatable in one direction to permit unwinding of said filamentary material from said reel to exit said housing through said outlet;

means on said spindle and engaging said hollow roll to provide a force opposing the unwinding of said filamentary material, said means on said spindle being located internally of said hollow roll;

an adjustable braking mechanism, said braking mechanism being located internally of said hollow roll and operative between said spindle and said means on said spindle to adjust said force opposing the unwinding of said filamentary material and thereby establish a first tension on said filamentary material to be unwound from said reel; and complementary tensioning means supported internally of said housing and engaging said filamentary material between said reel and said housing outlet, said complementary tensioning means applying an additional tensioning force opposing the unwinding of said filamentary material from said reel.

2. A cassette as defined by claim 1, wherein said means on said spindle and engaging said hollow roll is a spring, said adjustable braking mechanism includes a disc rotatable on said spindle, a brake shoe axially movable on said spindle and a screw threaded to said spindle, one end of said spring is fixed to said hollow roll, the other end of said spring is fixed to said disc, and said brake shoe is adjustable to move into and away from friction contact with said disc by said screw.

3. A cassette as defined by claim 1, further including a second spindle supported internally of said housing and said complementary tensioning means includes a second hollow roll having a rubberized outer surface rotatably mounted on said second spindle, a spring located internally of said second hollow roll and an adjustable braking mechanism located internally of said second hollow roll, said spring having one end connected to said second hollow roll and a second end connected to said braking mechanism and said braking mechanism is adjustable to apply said additional tensioning force opposing the unwinding of said filamentary material from said reel.

4. A cassette as defined by claim 3, and further including two freely rotatable rollers and means biasing each of said rotatable rollers into contact with said rubberized outer surface of said second hollow roll at peripherally spaced locations of said outer surface whereby said filamentary material engages a portion of the circumference of said rubberized outer surface of said second hollow roll between said two freely rotatable rollers with one of said rollers feeding said filamentary material to said second hollow roll and the other roller withdrawing said filamentary material from said second hollow roll.

5. A cassette according to claim 3, wherein the spring provided internally of the second hollow roll is selected to be of a size and capacity to maintain the additional tensioning force greater than or equal to the first tension.

6. A cassette as defined by claim 1 or claim 3, and further including holding means external of said housing outlet for engaging said filamentary material when it is tensioned and preventing said tensioned filamentary material from re-winding on said reel.

* * * * *